United States Patent [19]

Johnson

[11] Patent Number: 4,583,711
[45] Date of Patent: Apr. 22, 1986

[54] RIGID MOUNT COUPLER WITH FLOW CHECK STOP

[75] Inventor: Lyle R. Johnson, Minneapolis, Minn.

[73] Assignee: Parker-Hannifin Corporation, Cleveland, Ohio

[21] Appl. No.: 749,846

[22] Filed: Jun. 28, 1985

[51] Int. Cl.[4] .................................................. F16L 37/28
[52] U.S. Cl. ................................... 251/149.6; 137/614; 137/614.05; 137/614.06; 285/1; 285/316
[58] Field of Search .............. 137/614, 614.03, 614.05, 137/614.06; 285/316, 1; 251/149.6, 149.9

[56] References Cited
U.S. PATENT DOCUMENTS

| | | | |
|---|---|---|---|
| 3,236,251 | 2/1966 | Hansen | 137/614.05 |
| 3,477,468 | 11/1969 | Kopaska | 137/614.05 |
| 3,482,602 | 12/1969 | Jarnagon et al. | 137/614.05 |
| 3,549,175 | 12/1970 | Evons | 285/1 |
| 3,791,411 | 2/1974 | Bogeskov et al. | 137/614.02 |
| 4,200,121 | 4/1980 | Walter et al. | 137/614.05 |
| 4,388,947 | 6/1983 | Stewerwald | 137/614.06 |
| 4,398,561 | 8/1983 | Maldavs | 137/614.05 |

Primary Examiner—A. Michael Chambers
Attorney, Agent, or Firm—Joseph B. Balazs

[57] ABSTRACT

A rigid mount, breakaway, quick coupler for fluid interconnection includes a spring-activated mechanical stop therein to prevent flow-checking. The flow check stop is supported in a cross bore in a movable inner body member of the coupler and cooperates with a ramp surface for positioning thereof in aligned or laterally displaced positions from the axially movable, flow-checking valve pin, thereby respectively to prevent or allow valve pin movement.

6 Claims, 6 Drawing Figures

RIGID MOUNT COUPLER WITH FLOW CHECK STOP

BACKGROUND OF THE INVENTION

This invention relates to quick coupler devices for fluid systems, and more particularly, to a rigid mount, breakaway, quick coupler having a flow-check feature therein.

Similar devices of this type are well known in the art, however, there are disadvantages with most of these because of the mode of operation and the varied applications which the coupler encounters. Some of the prior art devices are directed to the agricultural environment wherein the coupler is mounted on a tractor for receiving fluid from the control valve of the tractor and for coupling with the hose nipple of a hydraulic implement to be actuated by the fluid power source. Often this implement is a closed fluid system so that the nipple is presented to the coupler under fluid pressure. In this event, the accommodation must be made for the different mechanical interconnection which occurs and the subsequent opening of the closed fluid valve of the nipple to a full open flow condition.

Most of the couplers of this type which rely on a spring to hold the nipple valve open are subject to an undesirable characteristic called flow-checking. Flow-checking occurs when a surge of oil moves from nipple to coupler with sufficient force to overcome the coupler valve spring and allow the nipple valve to close and check the flow of oil. Mechanically actuated stops have been provided in the past to prevent flow-checking and the instant invention is an improvement in this type of device.

One example of prior art valve is shown in U.S. Pat. No. 4,200,121 wherein a mechanical stop is provided to produce the flow-checking feature. The stop is in the form of a pin which is spring loaded in the direction of its locking position and which cooperates with the stem of the coupler valve support member to control the flow-check movement of the coupler valve. A sleeve is provided on the stem and is axially movable relative thereto for resetting the stop pin by means of a ramp surface on one edge of the sleeve. Resetting of the coupler occurs upon disengagement of the nipple and leaves it in a position of preparedness for the next engagement cycle. A second embodiment of coupler is described in this patent wherein a flow responsive vane provides rotary movement, against the action of a torsion spring, to actuate a detent cam for locking cooperation with the detent contour of the valve support stem.

Another prior art device is manufactured by the assignee of the above-noted patent, also employing a mechanical stop to prevent flow-checking. This stop is in the form of a hairpin spring in a right angle bend, where the legs of the pin straddle the valve stem under control of a shiftable sleeve and are spread by a ramp surface for resetting purposes.

A problem with the latter design is that the stop device is not actuated if the connecting nipple is not under pressure. In this instance the valve stem moves back only a short distance and does not cause shifting of the sleeve relative to the valve stem. Consequently, the nipple can flow-check. However, when flow-checking does occur, the coupler valve stem will move the full required distance wherein the sleeve separates from a shoulder on the stem and allows the stop to engage to prevent further flow-checking.

A still further form of prior art structure is shown in U.S. Pat. No. 4,398,561 wherein a mechanical stop cooperates with the coupler valve support stem to provide flow-checking. In this arrangement, however, the stop is activated by the flow of fluid through the coupler whereby a sleeve is moved to force locking balls into engagement with the stem. This type of design is subject to flow conditions and is dependent to some extent upon fluid viscosity and the like.

SUMMARY OF THE INVENTION

The instant invention relates to an agricultural quick coupler which allows connection of a nipple under hydraulic pressure and which includes a flow-check stop therein. The coupler is a rigid mount type which means that it can be mounted directly on the tractor control valve or connected to it with rigid piping. An arrangement of seals and chambers inside the coupler allows the transfer of oil which permits the internal movement of a body member therein relative to the outer housing, which is necessary to connect and disconnect the nipple. The coupler allows for breakaway without damage in the event of an accidental disconnect of the implement from the tractor.

This invention is provided by a coupling which includes a generally cylindrical housing having a threaded bore at one end for connection to a tractor control valve or the like and a relatively movable inner body member, carrying locking balls which cooperate with the housing to secure or release the nipple. The coupler valve is supported by a conventional support member, movable relative to the inner body member and biased to the valve closed position. The support member is a pin supported for axial movement and having an inner end adjacent the inner end of the body member for cooperation with the flow-check stop mechanism.

The stop mechanism comprises a stop member supported on a radially disposed pin, in turn supported in radial cross bores in the inner body member and movable therein in a diametral direction by the camming action of a ramp surface in the adjacent housing bore. A spring is used to bias the stop member against one end of the support pin and thus the support pin against the housing bore so that the stop member is moved by camming engagement with the housing into or out of the path of movement of the support pin for the coupler valve. The relative movement between the body member and housing is controlled by a detent which provides a releasable grip on the inner body member in two positions. This detent is overcome by outward axial force to move the body member to an outer position to automatically disengage the locking balls for release of the nipple.

DETAILED DESCRIPTION OF THE INVENTION

Figure 1:
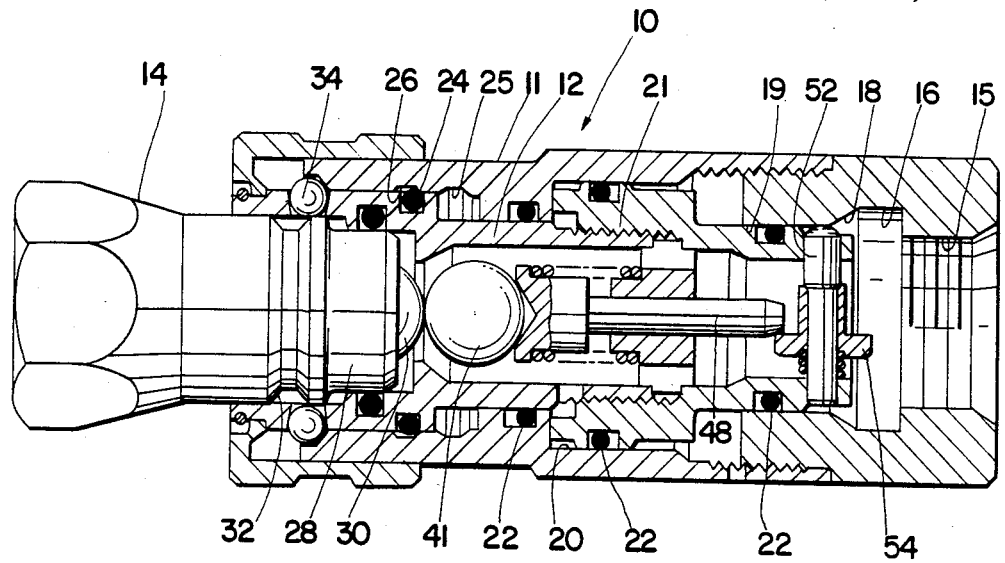
FIG. 1 is a view in cross section of the coupler valve of the invention with a nipple partially inserted therein and the coupler valve in an open position.

Referring now to the drawings, there is shown in several views the different stages of the coupling action of the coupler valve 10 of the invention. Coupler valve 10 comprises outer cylindrical housing 11 and inner cylindrical body member 12, axially slidable relative to housing 11 and having a bore adapted for receipt of nipple 14. Nipple 14 is typically connected to some form of agricultural implement or the like by means of a flexible hydraulic fluid line and is the termination for coupling to the coupler valve 10. In turn, the housing 11 of coupler valve 10 comprises a two part housing with the inner housing having a threaded bore 15 at one end which is adapted for connection directly to a control valve or to rigid conduit on a tractor. Bore 15 leads into a larger recessed bore 16, an intermediate taper section 18 and a smaller bore 19. The axially outer part of housing 11 includes a multi stepped bore 20 for receipt of body member 12.

Body member 12 in turn is a two part member threaded together for common movement by threads 21 and is adapted for axial sliding movement relative to housing 11 in housing bore 20. Various chambers are created between housing 11 and body member 12 by means of the multi-stepped configurations of the outer surface of body member 12 and the inner surface of bore 20 of housing 11 and which are sealed by o-ring seals 22. These provide equal volume chambers such that upon axial movement of body member 20, no differential in fluid displacement occurs and no differential fluid forces are developed. For a further description of the particulars of this type of coupler valve 10, reference is made to U.S. patent application Serial No. 450,890 issued to the same assignee and describing a similar break-away fluid coupler valve having relatively movable inner and outer housing and body members.

Body member 12, while supported for axial sliding movement in housing 11, is retained in an inner or outer position with respect thereto by means of a detent device consisting of snap ring 24 secured in a groove in body member 12 and cooperating with inner and outer grooves 25, 26 in housing 11. Grooves 25, 26 are axially adjacent one another, but are spaced a distance to provide sufficient movement of body member 12 with respect to housing 11 to achieve locking engagement with nipple 14, and operation of the valves therein. Body member 12 is shown in its outer position with snap ring 24 in outer groove 26 and is readily movable to groove 25 by means of sufficient force axially applied to the outer end of body member 12 to cause compression of snap ring 24 and its shifting from groove to groove. Likewise, a similar operation obtains upon outwardly directed axial force upon body member 12 which as will be described in greater detail hereinafter provides the breakaway feature of the coupling valve 10.

Nipple 14 is a conventional quick connect type nipple comprising a cylindrical nose portion 28 having a bore therein with a spring loaded nipple valve 30 biased to a closed position against a nipple valve seat therein. Nipple 14 further includes groove 32 on the outer periphery thereof adjacent nose portion 28 for locking purposes.

Figure 2:
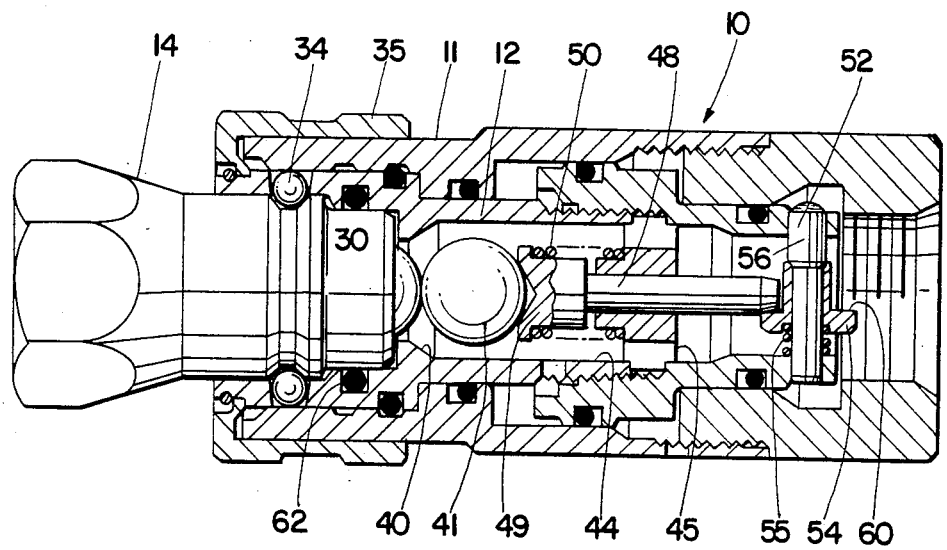
FIG. 2 is a cross sectional view of the coupler valve of the invention with nipple inserted therein and with body member shifted to the full inward position.

Locking means comprising a plurality of circularly disposed balls 34 are received in a plurality of radial slots in the outer portion of body member 12 and are cammed radially inwardly of the slots by engagement with the outer portion of housing 11 as body member 12 is moved inwardly of housing 11. As best seen in FIG. 2, balls 34 are then cammed inwardly into groove 32 of nipple valve 14 and secured by housing 11 in a manner well understood in the art. Collar 35 is provided outwardly of housing 11 and fixed to body member 12, providing a means for manually grasping body member 12 for movement between inner and outer positions thereof.

Figure 3:
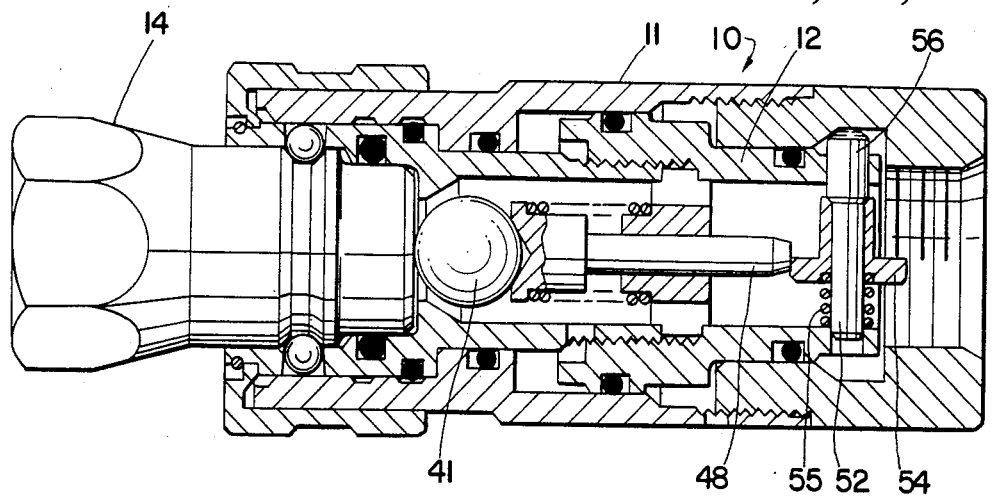
FIG. 3 is a cross sectional view of the coupler valve of the invention with nipple inserted therein with the coupler and nipple valves returned to the full open positions.
Figure 4:
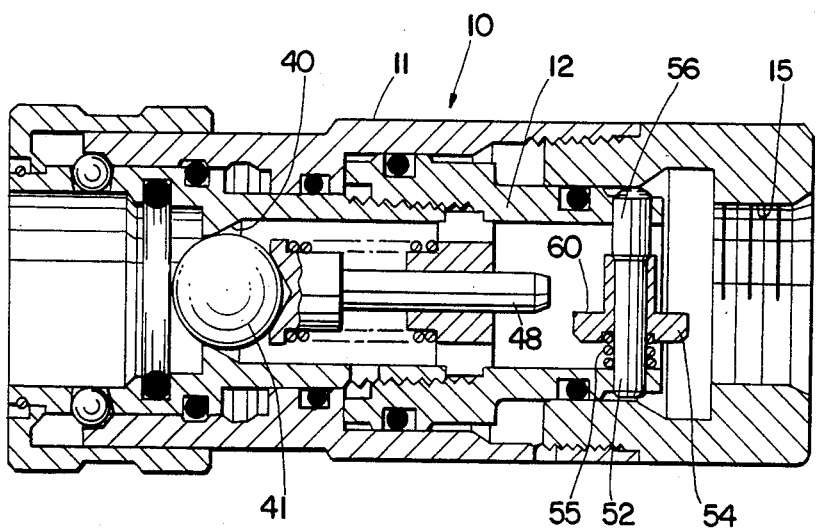
FIG. 4 is a cross sectional view of the coupler valve of the invention showing the coupler valve in the closed position.

Coupler valve seat 40 is formed on the inner periphery of body member 12 and cooperates with coupler valve 41 which in this embodiment of the invention is a ball valve member for closing and opening the inner bore 44 of body member 12. A circular strut 45, open to fluid flow therethrough, is clamped in body member 12 between the inner and outer parts thereof adjacent threads 21 and includes an axial bore therein in which valve support pin 48 is received for axial sliding movement relative to body member 12. Support pin 48 includes cup 49 at its outer end for partially receiving ball valve 41 and is biased to an outward position by means of spring 50 acting between strut 45 and a flange on cup 49. Thus, valve 41 is typically urged against coupler valve seat 40 to a closed position as best seen in FIG. 4 in the absence of other influences and serves to close the inner bore of body member 12 against fluid flow therethrough. Valve spring 50 has a spring rate about twice as strong as the spring rate of nipple valve 30 such that in the absence of other influences, coupler valve 41 will urge nipple valve 30 to an open position, the latter being limited to a maximum open position by a mechanical stop therein (not shown). This full flow position of the coupler valve 10 is best depicted in FIG. 3, wherein it is noted that the outermost edge of coupler valve 41 is approximately adjacent the inner periphery of coupler valve seat 40, providing a relatively large open space thereabout for full flow through the valve seat 40.

Figure 5:
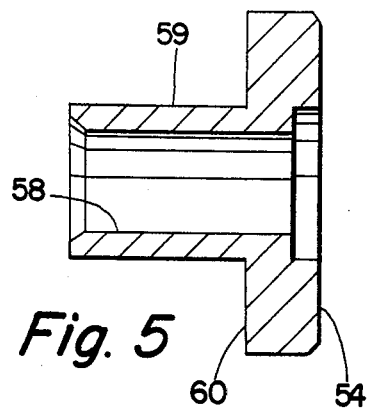
FIG. 5 is an enlarged cross sectional view of the stop member in the coupler valve of the invention.
Figure 6:
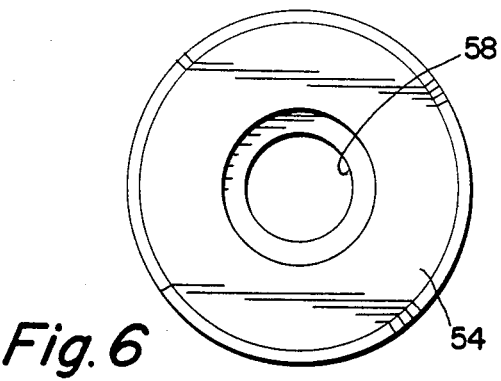
FIG. 6 is an enlarged bottom view of the stop member of the invention.

The stop means for preventing flow-checking of coupler valve 41 consists of cylindrical stop pin 52, stop member 54 and spring 55, which cooperate with the inner end of valve support pin 48. Stop pin 52 includes an enlarged cylindrical head 56 at one end thereof and is received in opposed cross bores in body member 12 at the innermost end thereof, placing stop pin 52 in a radial disposition and in alignment with valve support pin 48. Stop member 54 is a disc better seen in enlarged detail in FIGS. 5 and 6, having central bore 58 extending through elongated hub 59 and slidably receiving stop pin 52. The hub 59 of stop member 54 is urged against enlarged head 56 of the stop pin by means of spring 55 surrounding pin 52 and located between the inner periphery of body member 12 and a recessed surface in the lower face of stop member 54. The upper face 60 of stop member 54 is flat and serves to engage the side of the innermost end of valve support pin 48 as best seen in FIG. 2, for retaining stop member 54 against the bias of spring 55 in a position out of the path of movement of valve support pin 48. Thus, it will be seen that stop member 54 is urged by spring 55 in an upward direction as viewed in the figures, together with stop pin 52 so that the enlarged head 56 of stop pin 52 engages larger bore 16, taper section 18 or smaller bore 19 of housing 11, unless restrained as indicated in FIG. 2 by the inner end of valve support pin 48. The head 56 of pin 52 is domed to facilitate movement from surface to surface and the camming action of pin 52.

When body member 12 is in its outermost position as depicted in FIG. 1, stop pin 52 is in engagement with smaller bore 19, placing stop member 54 out of the axial path of movement of valve support pin 48. In FIG. 3 body member 12 is in its innermost position with stop pin 52 in engagement with the larger bore 16 of housing 11 placing stop member 54 in the path of movement of valve support pin 48, thereby preventing further inward movement, or movement to the right, of the valve support pin 48 or coupler valve 41. As body member 12 is moved outwardly from its innermost position, the enlarged head 56 of stop pin 52 moves along taper surface 18 thereby compressing spring 55 and allowing stop pin 52 to be received in smaller bore 19 in the position depicted in FIG. 1.

DESCRIPTION OF OPERATION

Referring now to FIG. 1, the initial stage of the coupling of nipple 14 to coupler valve 10 is depicted with the nose 28 of nipple 14 in engagement with a fluid seal 62 located in a groove in the outer portion of body member 12. Nipple valve 30 is pressurized and held in its outermost position as depicted in the usual condition of operation, thereby forcing coupler valve 41 from its valve seat 40 to the position shown, moving also therewith valve support pin 48 against the bias of spring 50. In this condition of the coupler valve 10, body member 12 is in its outermost position with snap ring 24 disposed in outer groove 26 thereby also placing stop pin 52 in engagement with the smaller bore 19 of housing 11, with stop member 54 thus in a lower position and out of the path of movement of valve support pin 48.

Continued inward insertion of nipple 14 is depicted in FIG. 2, wherein locking balls 34 begin to engage groove 32 thereby initiating inward movement of body member 12 against the resistance of snap ring 24. With such inner movement to the position depicted in FIG. 2, the inner end of valve support pin 48 passes over the upper surface 60 of stop member 54 thereby preventing further radial movement of stop member 54 or stop pin 52. At the end position depicted, locking balls 34 are fully received in grooves 32 and secured by housing 11, with body member 12 moved to the position wherein snap ring 24 is engaged in inner groove 25. As noted, since body member 12 is in its innermost position, stop pin 52 has been moved to the location of the larger bore 16 in housing 11 but is prevented from engagement therewith by the engagement of stop member 54 with the inner end of valve support pin 48. As pressure is equalized in coupler valve 10, when the flow control valve (not shown) on the tractor, for example, coupled to inlet bore 15 is opened, nipple valve 30 is mechanically urged only by coupler valve 41 and since coupler valve spring 50 is of a greater spring rate, it moves nipple valve 30 and coupler valve 41 to the full open position depicted in FIG. 3. Upon such movement of coupler valve 41 to the left as viewed in FIG. 3, valve support pin 48 is moved therewith under urging of spring 50 so that the inner end thereof is disengaged from the upper surface 60 of stop pin 52 allowing stop member 54 to be moved upwardly under the urging of spring 55 to a position adjacent the end of valve support pin 48, or in the path of return movement thereof. During such movement stop pin 52 is moved to a position where the enlarged head 56 thereof is in engagement with the larger bore 16 of housing 11. By this arrangement stop member 54 is positioned to block any movement of valve pin 48 back into the coupler to provide a positive means to prevent flow-checking.

In the event a nipple 14 is presented to coupler valve 10, which nipple is not under pressure when connected, the internal arrangement of coupler valve 10 will be as depicted in FIG. 3 wherein both coupler valve 41 and nipple valve 30 are open and stop member 54 is in a position to prevent flow-checking. Stop member 54 has moved to the position of the larger bore 16 of housing 11 by inward movement together with body member 12, but since coupler valve 41 has not been retracted inwardly together with valve support pin 48, stop member 54 and stop pin 52 are free to move radially under the urging of spring 55 to the position depicted in FIG. 3.

FIG. 4 is a depiction of the disconnected position of coupler valve 10 wherein nipple 14 has moved body member 12 through the interengagement between the locking balls 34 and against the bias of detent snap ring 24 to the position where the snap ring 24 is engaged in the outermost groove 26. Stop pin 52 is carried with body member 12 against the taper section 18 into the smaller bore 19 of housing 11, forcing stop member 54 downwardly against spring 55 so that the upper surface 60 of stop member 54 is out of the path of movement of valve support pin 48, in preparation for receipt of nipple 14 as described with respect to FIG. 1. There is no need to provide alignment means between stop member 54 and stop pin 52 as the stop member is symmetrical and may be oriented in any position on stop pin 52.

Stop member 54 is shown in the form of a disc which requires no specific orientation on pin 52, but other devices could be used as well which, for example, might have a bore to receive the inner end of valve support pin 48. A device such as this, however, would have to be appropriately keyed so that the bore thereof is always presented to support pin 48.

I claim:

1. A quick coupler for fluid interconnections, comprising a housing having a bore therein,
   a body member axially movable in said housing bore between an outer, disconnect position and an inner coupled position,
   detent means for releasably retaining said body member in said inner and outer positions,
   locking means cooperable between said body member and said housing for releasably securing a nipple in said body member,
   a valve and valve seat in said body member for preventing fluid flow therethrough, valve support means movable with and mounting said valve for axial movement relative to said body member,
   a spring outwardly biasing said valve support means and said valve to a closed position,
   an elongated member on said valve support means extending toward the inner end of said body member, and
   stop means at said inner end of said body member movable between radially inner and outer positions, respectively into and out of the path of movement of said elongated member for preventing and allowing rearward movement of said elongated member and thereby of said valve member, said stop means comprising, a radially disposed stop support slidably mounted at the inner end of said body member for axial movement with said body member between inner and outer positions and for radial movement relative to said body member, said stop support being disposed in a larger bore of said housing in said inner position and in a smaller bore of said housing in said outer position, said housing having a taper surface between said larger and smaller bores, a stop member on said support mounted for movement with said support and adapted to be positioned in and out of the path of movement of said elongated member when said stop support is positioned respectively in said larger and smaller bores of said housing, and spring means biasing said stop support toward said larger and smaller bores and said taper surface of said housing.

2. A quick coupler as set forth in claim 1 wherein said coupler is a rigid mount coupler and said housing is stationary.

3. A quick coupler as set forth in claim 2 wherein said coupler is a breakaway coupler, said locking means being disengaged in said outer position, said detent means being adapted to automatically release said body member for movement to said outer position upon axial outward urging of said body member.

4. A quick coupler as set forth in any one of claims 1, 2 and 3 wherein said stop support is a pin disposed in radial bores in said body member and said stop member is mounted on said pin between said bores.

5. A quick coupler as set forth in claim 4 wherein said stop member is slidably mounted on said pin against an abutment thereon and is biased against said abutment by said spring means.

6. A quick coupler as set forth in claim 5 wherein said stop member is a disc having a flat upper surface and a central bore in which said support pin is received, said upper surface and the periphery of said disc being engageable with said valve support member to prevent, respectively, radial movement of said stop means and axial movement of said valve support member.

* * * * *